Sept. 18, 1956 A. J. STAVERMAN 2,763,607
PROCESS AND APPARATUS FOR DESALTING LIQUIDS BY MEANS OF
ION-EXCHANGERS, AND FOR REGENERATING
SAID EXCHANGERS
Filed June 17, 1952
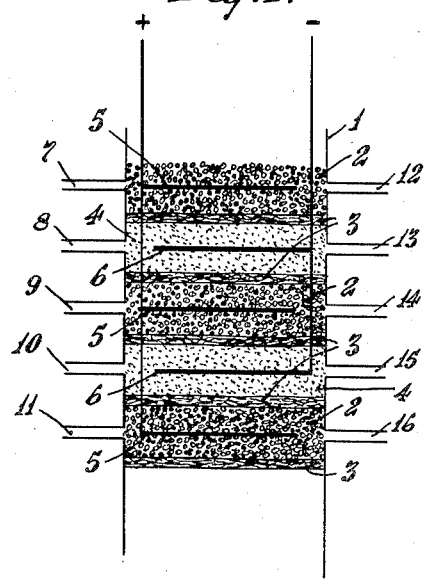
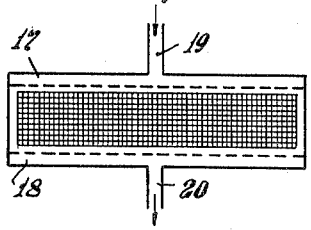
INVENTOR
Albert Jan Staverman
BY
Campbell Bumbaugh Leur Graves
ATTORNEYS

2,763,607

PROCESS AND APPARATUS FOR DESALTING LIQUIDS BY MEANS OF ION-EXCHANGERS, AND FOR REGENERATING SAID EXCHANGERS

Albert Jan Staverman, Leiden, Netherlands, assignor to Nederlandse Organisatie voor Toegepast Natuurwetenschappelijk Onderzoek ten behoeve van Nijverheid, Handel en Verkeer, The Hague, Netherlands, a corporation of the Netherlands Application June 17, 1952, Serial No. 293,952

Claims priority, application Netherlands June 19, 1951

4 Claims. (Cl. 204—131)

The invention relates to a process for desalting liquid in a multiple bed having separated layers of anion active and cation active material.

Process of desalting liquids by passing these liquids through beds of ion exchangers are applied in practice on a large scale. According to one such method, separate columns are applied for anion and cation active materials and the active material is regenerated by passing through these columns separately a base or a basic reacting solution and an acid or a saline solution.

Alternatively, mixtures of anion and cation active materials are applied. These two materials must be separated by flotation or otherwise before regeneration can take place. Regeneration of the mixture of saturated anion and cation exchangers by electrodialysis has also been suggested, but it was supposed that the high cost of electrical energy would be prohibitive.

For many purposes it is advantageous to use a multiple-layered bed with alternating layers of anion and cation active material, in order to avoid great fluctuations in pH in the liquid to be desalted as it is flowing through the columns. However, the filling and emptying of these multiple-bed containers at the periodical regeneration, which for each type material must take place separately, is very prejudicial to the operation of apparatus of this kind.

It is the main object of the invention to provide a process and an apparatus for regeneration of the anion active material and the cation active material of a multiple bed in the container.

Other objects will be apparent from the following specification and from the claims.

I have found that anion active and cation active material applied in separate layers in a multiple bed container can be regenerated by electrolysis of a salt solution in the container, with formation of lye in the anion active layers and of acid in the cation active layers.

This process has special advantage when using thin layers of anion and cation active material in alternating succession in the direction of flow of the liquid to be desalted. In such a multiple bed it is possible to regenerate the exchangers in the container by mounting electrodes in these layers and passing a salt solution through the columns while electrical current is passed through the solution. To achieve good efficiency during the regeneration, the direction of flow in the regeneration period must preferably be in the plane of the thin layers of active material, and is thus about perpendicular to the direction of flow of the solution to be desalted.

It is, however, also possible to work with thicker layers of exchanger; in that case it is advantageous to give the electrodes such a shape that the lye or acid which is formed is evenly distributed throughout the entire thickness of the layer.

In order to attain a good efficiency the trajectory of the liquid which flows through the exchanger during the process of regeneration must not be too long, as absorption of salt, formed by the regeneration process, occurs in that case.

The process and apparatus according to the invention will be further described in combination with the drawings.

In Figure 1 the apparatus to be used is schematically shown in vertical section, whereas Figure 2 represents schematically a top view of a technical apparatus.

In Figure 1, the reference numeral 1 represents a container in which layers of cation active material 2 are separated from layers of anion active material 4 by thin layers of glass wool 3. Corrosion-resistant anodes 5 have been fitted into the cation active material, said anodes e. g. consisting of grids of platinum or of magnetite. In the layers of anion active material cathodes 6 are present which e. g. may consist of nickel or platinum.

When using the container for desalting, the liquid to be desalted is passed through the column in a vertical direction; on regeneration, the salt solution is introduced via the pipelines 7–11 and carried off via the pipelines 12–16. During this process electrical current is simultaneously passed through the system.

Through a cylindrical test apparatus having a diameter of 7 cm., constructed according to Figure 1 and provided with two layers of cation exchanger Amberlite IR 100 (a phenol-formaldehyde, sulfonated in the nucleus in the hydrogen form) having a total weight of approximately 85 g., and with two layers of an anion exchanger Amberlite IR 4B (a phenol-formaldehyde, with amino-groups in the aromatic nucleus in the hydroxyl form) having a total weight of 100 g., 200 cm.$^3$/hour of a 0.1% NaCl-solution were passed through in vertical direction until the chloride ion concentration of the effluent is practically the same as the chloride ion concentration of the influent.

Thereupon, the same salt solution was passed through the apparatus in a horizontal direction with simultaneous passage of the current, providing regeneration of the exchangers by the lye and acid formed by electrolysis. In this regeneration step, the salt concentration of the effluent was higher than that of the influent liquid. This regeneration was continued until the chloride concentration of the effluent had become about equal to that of the influent liquid, after which the whole process could be repeated. Platinum wire-gauze was used for the electrodes.

The amount of NaCl which could be taken up in the first step by the container after regeneration was measured. The efficiency of the regeneration proved to be highly dependent on the strength of current during the process of regeneration. This was probably a consequence of secondary reactions, such as the formation of chlorine, occurring at the anode when too great a current was used. The results obtained are shown in Table I.

*Table I*

| Strength of current during the process of regeneration | Consumption of energy per 100 g. of re-absorbed NaCl |
|---|---|
| Amp. | kwh. |
| 0.06 | 0.30 |
| 0.08 | 0.55 |
| 0.10 | 0.80 |

Furthermore it was observed that the quantity of NaCl absorbed after regeneration amounted to a comparatively small percentage of the total capacity of the exchanger.

Therefore, regeneration mainly took place in the vicinity of the electrode, and thus the thickness of layer of the exchanger (about 2 cm.) is too great for economical use.

It also appeared that the time for entirely saturating the active materials in the first step is very long and that in one-third of the time needed for complete saturation, the column is 80% saturated. Also, the efficiency improves if this regeneration is not pursued to removal of the last traces of salt.

On the basis of these data, an apparatus was constructed as shown in Figure 2. This apparatus consists of a column having a rectangular horizontal section with interior dimensions of 10 x 50 cm. The longest vertical walls 17, 18 are double and serve to supply liquid via pipeline 19 and outflow via pipeline 20 during the regeneration. These walls are provided on the inside with horizontal rows of perforations. These rows are spaced at distances of 1 cm. In this column, grid-shaped platinum anodes and nickel cathodes have been fitted alternately in the plane of these rows of perforations and in the center of each of the layers of cation active material and anion active material, respectively each layer has a thickness of about 5 mm. These layers are separated by layers of glass-fibre tissue having a thickness of about 5 mm. The total height of the column is about 1 m. Use of this column for 8 hours with regeneration with an electrical current of 16 amp., reduced the NaCl concentration in 800 litres of a NaCl-solution from 1 g./l. to 0.2 g./l. with an efficiency of about 0.22 kwh. per 100 g. of removed NaCl. This amounts to less than 2 kwh. per m.$^3$ of treated solution.

What I claim is:

1. Process for desalting liquids comprising passing salt-containing liquids through a bed comprising a plurality of alternate layers of anion active and cation active material and regenerating the active materials by passing an aqueous solution of a salt which, on electrolysis, provides H ions at the anode and OH ions at the cathode through the layers in the direction of said layers while simultaneously electrolyzing the solution to form alkali and acid by passing an electrical current between anodes in the cation active layers and cathodes in the anion active layers, respectively.

2. Apparatus for desalting liquids by anion and cation active materials and regeneration of these materials comprising a container, alternate layers of anion active material and cation active materials in said container, cathodes in the anion active layers, anodes in the cation active layers, cathodes and anodes in these layers, supply and outflow lines at opposite ends of said container for passing liquid successively through the layers of anion active material and cation active material in a direction substantially perpendicular thereto, and supply and outflow lines at the sides of said container for passing liquid through each layer separately in a direction substantially parallel thereto.

3. Process according to claim 1, characterized in that during the process of regeneration the solution which is to be desalted, is used as the salt solution.

4. The apparatus set forth in claim 2 in which said layers are approximately 5 millimeters thick and are separated by thin layers of porous inert material.

References Cited in the file of this patent

UNITED STATES PATENTS

| | | |
|---|---|---|
| 2,057,232 | Endell | Oct. 13, 1936 |
| 2,341,356 | Briggs | Feb. 8, 1944 |
| 2,525,497 | Monfried | Oct. 10, 1950 |

FOREIGN PATENTS

| | | |
|---|---|---|
| 491,073 | Belgium | Sept. 12, 1949 |

OTHER REFERENCES

"Industrial Electrochemistry," by Mantell (1931), pages 250 thru 253.